United States Patent [19]

Siryj et al.

[11] Patent Number: 5,062,092
[45] Date of Patent: Oct. 29, 1991

[54] JUKEBOX HAVING ROTATABLE DISK STACK

[75] Inventors: Bohdan W. Siryj, Cinnaminson; Michael E. York, Gibbsboro, both of N.J.

[73] Assignee: General Electric Company, Camden, N.J.

[21] Appl. No.: 441,014

[22] Filed: Nov. 24, 1989

[51] Int. Cl.⁵ ............................................. G11B 17/22
[52] U.S. Cl. ...................................... 369/38; 369/30; 369/36
[58] Field of Search ....................... 369/24, 30, 36, 38, 369/191, 192, 194, 34, 35, 37, 39, 195, 199, 200; 360/92

[56] References Cited

U.S. PATENT DOCUMENTS

| | | | |
|---|---|---|---|
| 2,272,453 | 2/1942 | Wilcox | 369/38 |
| 2,620,193 | 12/1952 | Pettersson | 369/200 |
| 4,949,324 | 8/1990 | Arata | 369/30 |

FOREIGN PATENT DOCUMENTS 529368 11/1921 France .................................. 369/30

Primary Examiner—Stuart S. Levy
Assistant Examiner—Edward H. Sikorski
Attorney, Agent, or Firm—Raymond E. Smiley

[57] ABSTRACT

Apparatus for presenting a desired one of a stack of N information disks with a selected one of its two information surfaces in a desired orientation to an information utilization device. The apparatus includes a mechanism for rotating the disks as a stack to put the selected surface in the desired orientation, for translating the disks as a stack to position the desired disk opposite the utilization device and for translating the desired disk into the utilization device.

11 Claims, 6 Drawing Sheets

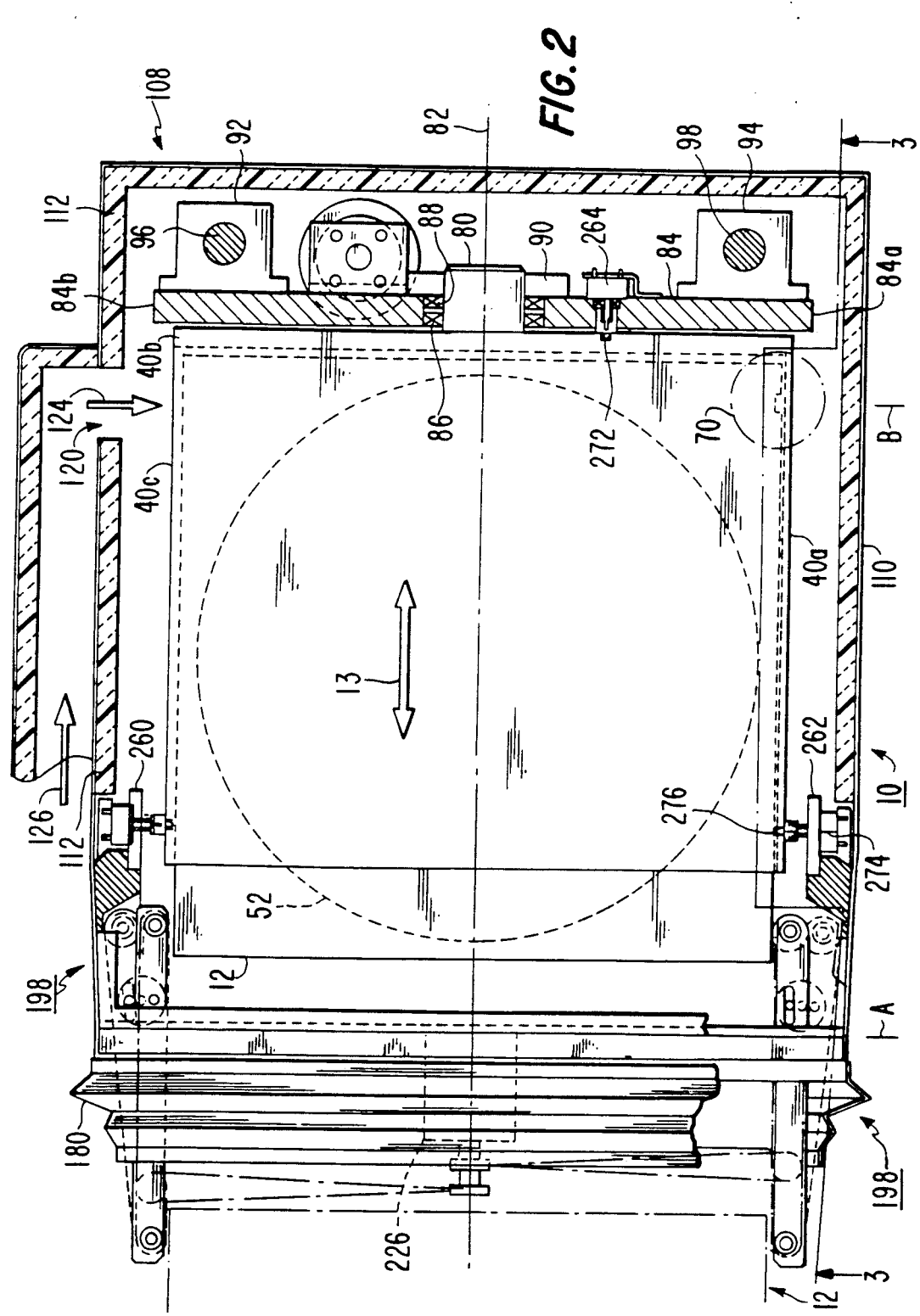

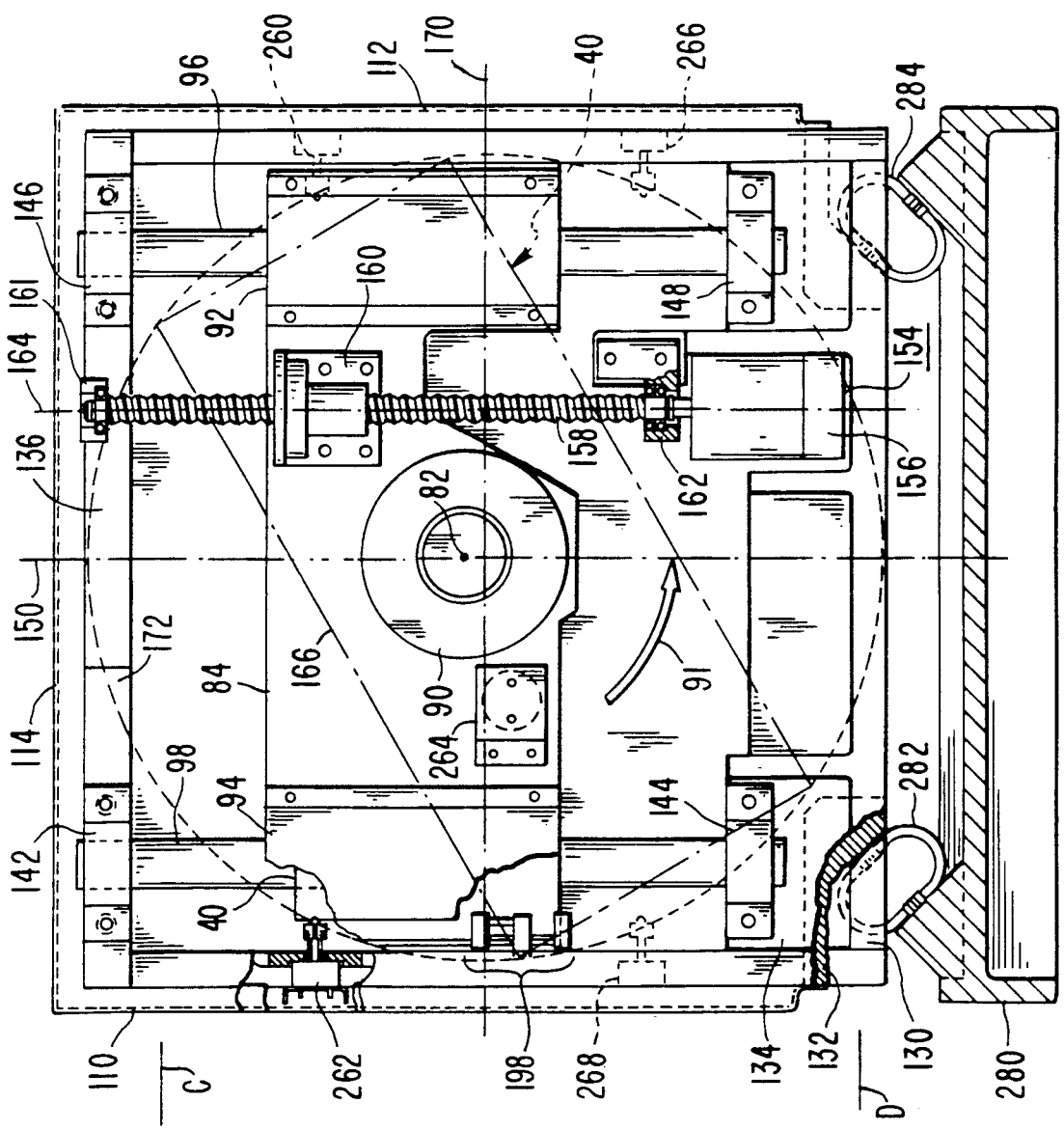

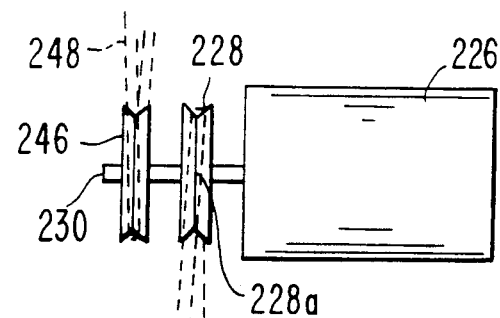
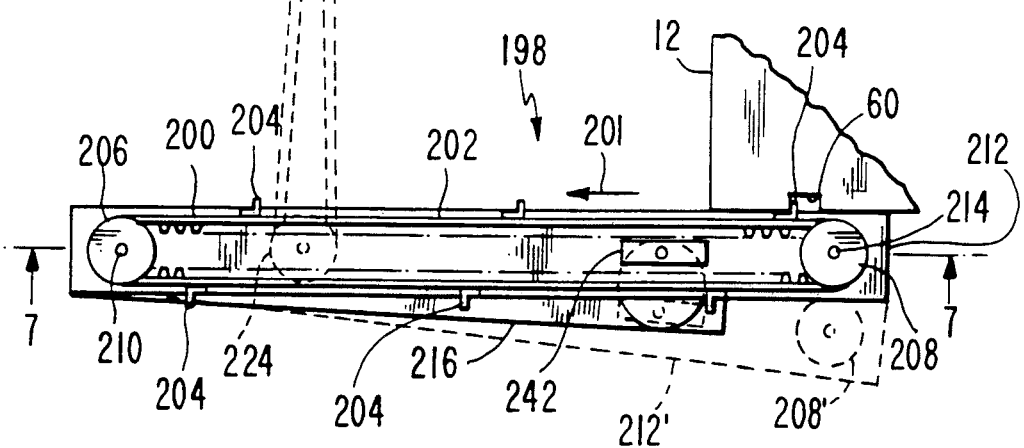
*FIG. 6*
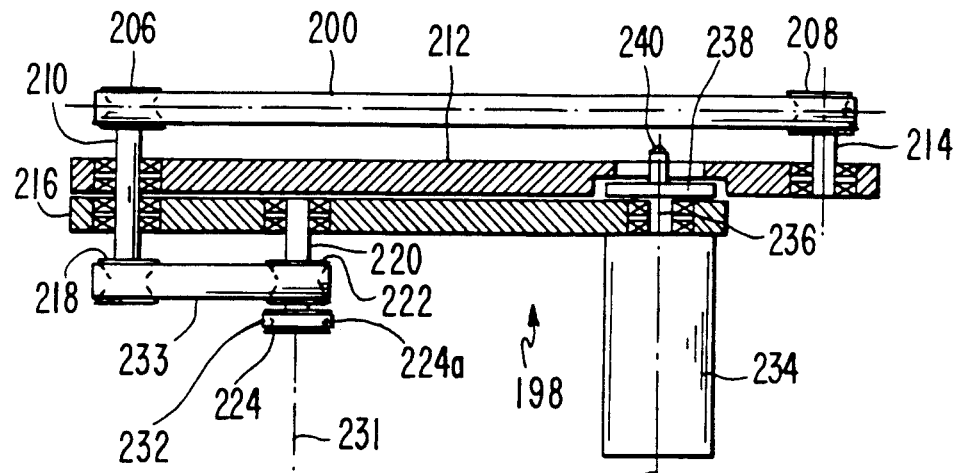
*FIG. 7*

JUKEBOX HAVING ROTATABLE DISK STACK

BACKGROUND OF THE INVENTION

1. Field of Invention

This invention relates to an apparatus for presenting a given side of any one of N two-sided information disks to a disk utilization device, and, more particularly, to an apparatus which holds the disks in a stack and translates the entire stack to present the given side to the utilization device.

2. Description of the Prior Art

The classic jukebox is a well-known apparatus for translating a given record, each containing two information bearing surfaces, of the many records stored in the jukebox to a record playing apparatus. In some players there are two player transducing heads so that either side of a record may be played without turning the record over, and in other jukeboxes a mechanism turns over the record to provide proper orientation relative to the player transducer.

SUMMARY OF THE INVENTION

Apparatus for presenting any one of N disks, each comprising two opposed information surfaces, to an information utilization unit with a given one of the information surfaces in information translating relationship therewith, comprises in combination, means for holding the N disks in a stack, means for translating the N disk stack between first and second orientations, and means for translating the stack to enable a desired one of the N disks to be presented to the information utilization unit with the given one of the surfaces in the desired orientation. The means for holding the N disk in a stack holds the stack with one of the information surfaces of one disk facing one of the information surfaces of the next one of the disks. The means for translating the N disk stack between first and second orientation is arranged such that the first orientation allows one of the information surfaces to become in information translating relation with the information utilization unit and the second orientation allows the other of the information surfaces to become in information translating relation with the information utilization unit.

BRIEF DESCRIPTION OF THE DRAWINGS

FIG. 2 is a top cross-section view of the jukebox along lines 2—2 of FIG. 1;

FIG. 4 is an end cross-section view of the jukebox along lines 4—4 of FIG. 3;

FIG. 6 is a top view of a disk moving apparatus; and

FIG. 7 is a side cross-section view along lines 7—7 of FIG. 6.

DETAILED DESCRIPTION OF THE DRAWING

Figure 1:
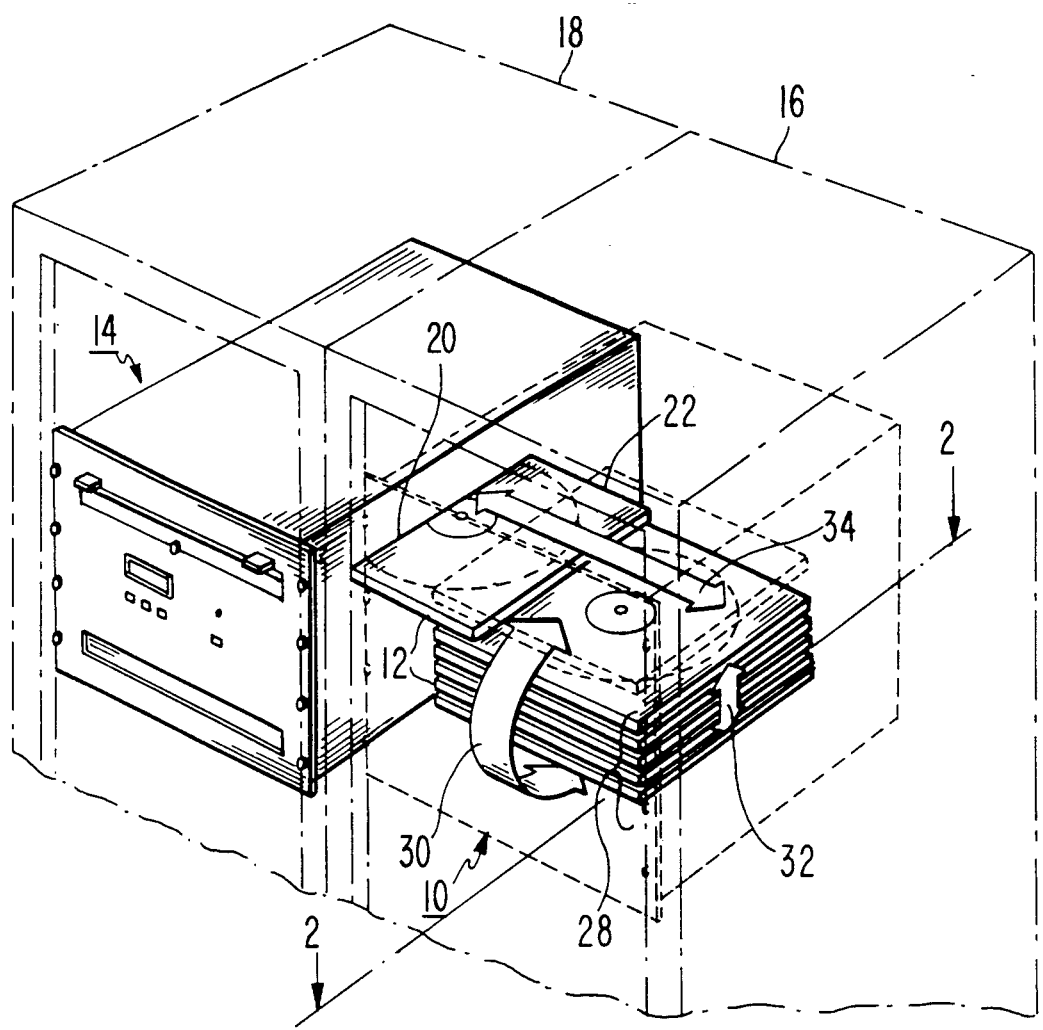
FIG. 1 is a jukebox apparatus and information utilization unit illustrated in mechanical schematic form where the jukebox holds a plurality of disks with an illustration of how a desired disk is presented in proper orientation to an information utilization unit.

Referring now to FIG. 1, an apparatus generally labelled 10, and which will be referred to as a jukebox, contains a plurality of cartridges 12 (each housing and protecting an information disk), and is capable of presenting a desired one of cartridges 12 to an information utilization apparatus generally labelled 14 which is also known as a disk drive.

Figure 5:
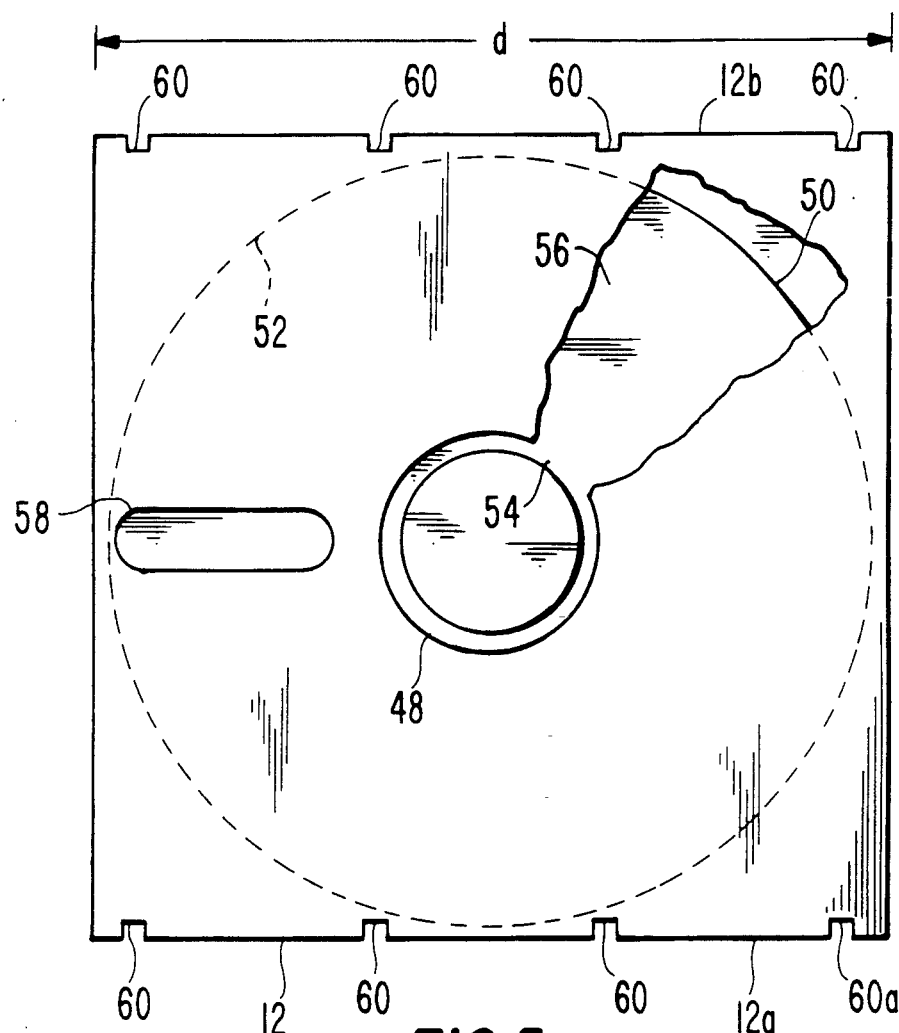
FIG. 5 is a typical disk and disk-cartridge combination for use in the jukebox.

The term "information disk" is meant to refer to a disk which has information recorded on it in some form such as grooves, magnetic and/or magneto-optic, or is capable of having information recorded thereon. Information utilization apparatus 14 is then an information reading and/or writing apparatus. FIG. 5 illustrates a cartridge-disk combination comprising cartridge 12 including a central annular opening 48 enclosing and protecting a circular disk 50 visible by a partially broken away cartridge. Disk 50, which is positioned in cartridge 12, as illustrated by dashed line 52, includes a center annular opening 54 which permits disk 50 to be rotated within cartridge 12 by means within apparatus 14. Disk 50 has two information surfaces, one, 56 visible in FIG. 5 and another surface on the underside of the disk as viewed in FIG. 5. An opening 58 in cartridge 12 and a similar opening (not visible) on the underside of cartridge 12 permit the surfaces of disks to be written on and/or read from. Hereafter, when movement of cartridge 12 is discussed it will be understood that movement also occurs to disk 50.

As illustrated in FIG. 1, each of apparatus 10 and apparatus 14 may be mounted adjacent one another in adjoining relay racks 16 and 18 such that a slot 20 in apparatus 14 (particular cartridge 22 of cartridges 12 is positioned in slot 20) is positioned to accept a properly positioned one of cartridges 12.

Information utilization apparatus 14 has a reading and/or writing transducer 15 (FIG. 3) for reading or writing only one surface at a time, such as 56 of disk 50 (FIG. 5), whereas the disk has information recorded on (or capable of being recorded on) both its top and bottom (not shown) surfaces.

In FIG. 1, the various cartridges 12 are stacked one atop the other. If it is desired to read and/or write a bottom surface of a disk 50, apparatus 10 contains a mechanism for rotating together the entire stack 28 of cartridges 12 as illustrated by arrow 30. Once the cartridges 12 and therefore disks 50 are positioned with the proper disk surface "up" the entire stack of cartridges is then translated as illustrated by arrow 32 to position a desired one of the cartridges opposite slot 20 in apparatus 14. Then the structure contained in apparatus 10 translates the desired cartridge, for example, cartridge 22, into slot 20 and thus into utilization apparatus 14, as indicated by arrow 34.

Although, as illustrated in FIG. 1, it is the top cartridge which is being positioned into apparatus 14, it will be understood that any cartridge 12 of the stack 28 of cartridges could be translated into and out of apparatus 14. Utilization apparatus 14 is considered to be of conventional design and is not part of the invention and will accordingly not be described further.

Jukebox 10 is the subject of the present invention and will hereinafter be described in connection with the description of FIGS. 2-4, to which attention is now directed.

Figure 2A:
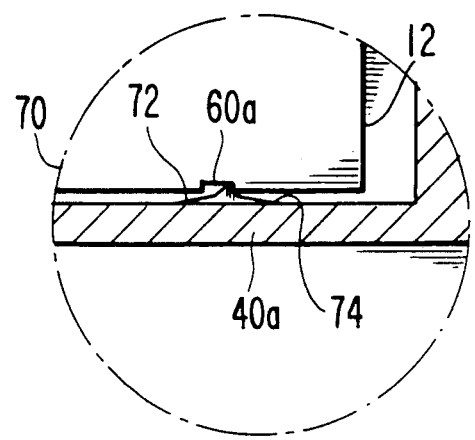
FIG. 2a is an enlargement of a portion of FIG. 2.
Figure 3:
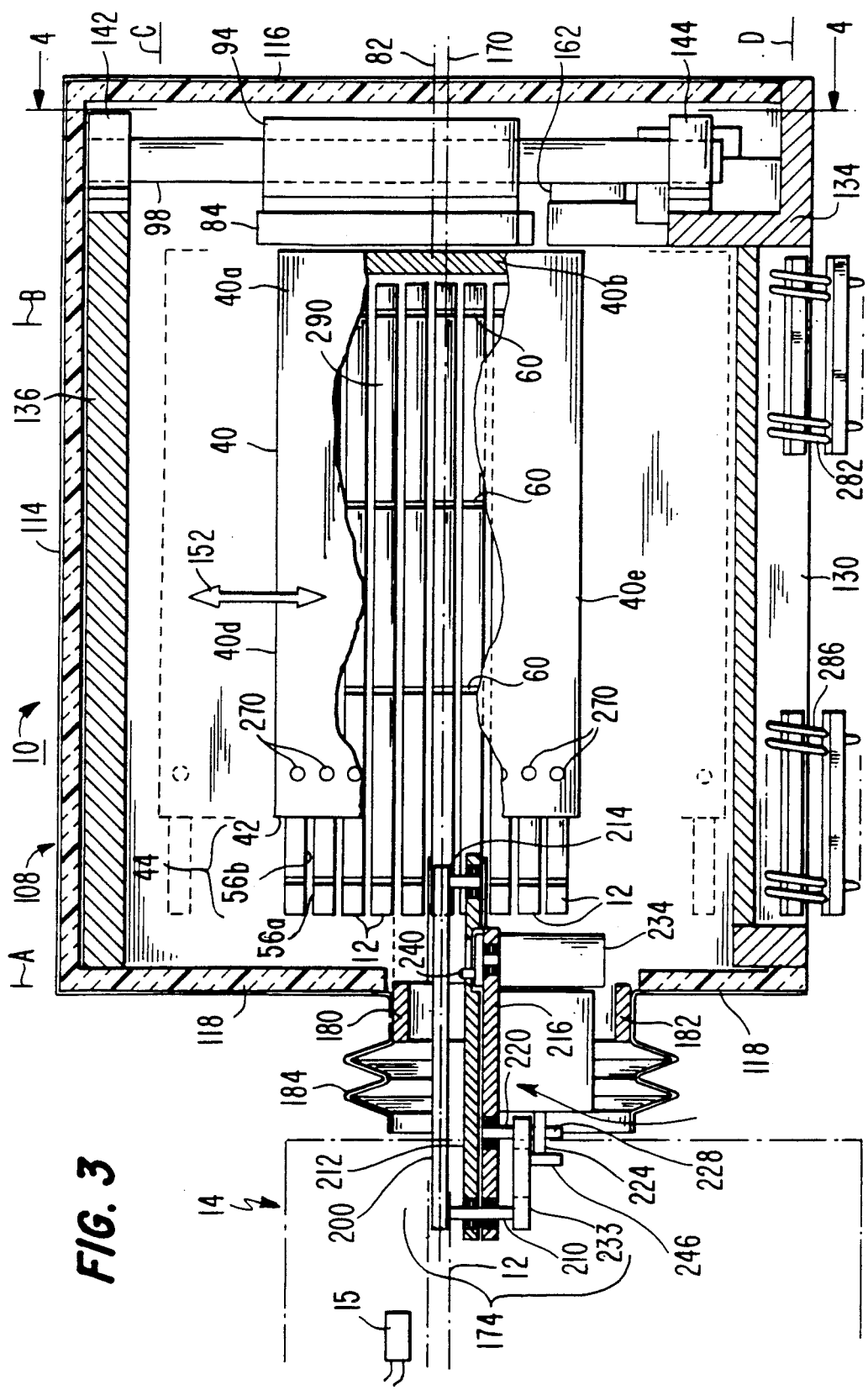
FIG. 3 is a side cross-section view of the jukebox along lines 3—3 of FIG. 2.

FIG. 2 is a cross-section plan view generally along lines 2—2 of FIG. 1, FIG. 3 is a cross-section elevation view generally along lines 3—3 of FIG. 2, and FIG. 4 is a cross-section elevation end view generally along lines 4—4 of FIG. 3. Match lines A, B, C, and D enable the figures to be positioned as if they were drawn on a single large drawing sheet. With reference first to FIG. 3, a rectangular container 40 is closed on all sides except side 42. Container 40 is arranged to hold a stack of cartridges 12, one above the other. A playing surface 56b of a disk within one such cartridge 12 faces an opposed playing surface 56a of a next lower disk, as illustrated in FIG. 3. As illustrated in FIG. 3, there are ten such cartridges and therefore ten disks, one atop the other. The ends of all of the cartridges generally indicated by bracket 44 projects out the open end 42 of container 40.

A typical cartridge 12 is illustrated in FIG. 5 and has been briefly described before. Cartridge 12 is of dimensions d by d, where d may be on the order of 15 centimeters, by way of example, and therefore disk 50 is slightly smaller in diameter than dimension d. Cartridge 12 contains along two opposite sides thereof 12a and 12b a plurality of notches or castellations 60 (and one 60a). The purpose of notches 60 (and 60a) is to enable cartridge 12 and thus disk 50 to be pulled out of container 40 by a mechanism to be hereinafter described.

Additionally, notch 60a enables cartridge 12 to remain positioned in the container 40 until it is desired to be removed therefrom. Referring to FIG. 2a which is a blowup of portion 70 of FIG. 2, wall 40a of container 40 has along its inner surface a detent spring 72 which is secured at point 74 to wall 40a and engages notch 60a to resiliently maintain cartridge 12 in place in container 40. It will be understood that in the example shown in FIG. 3 there would be ten such detent springs 72, although none are shown in FIG. 3 and only one is shown in blow-up 70 of FIG. 2.

As illustrated in FIGS. 2 and 3, the rear wall 40b of container 40, that is the wall opposite opening 42, is relatively thick compared to the remaining walls of the container which are, in fact, sufficient thin that they are illustrated as single lines in FIG. 2, for example. As best illustrated in FIG. 2, a shaft 80 is connected to wall 40b, the shaft being centered about center line 82. Center line 82 is centered horizontally, as illustrated in FIG. 2, between walls 40a and 40c and vertically between walls 40d and 40e as best illustrated in FIG. 3. Shaft 80 projects through an opening in a structural plate 84. The opening in structural plate 84 includes bearings 86 and 88 which are in actual contact with shaft 80. A motor 90 is connected to structural plate 84 and is rotationally connected to shaft 80 to cause shaft 80 to rotate about center line 82 as will be described hereinafter.

Guide blocks 92 and 94, which surround and ride up and down along parallel guide shafts 96 and 98, are secured to one face of structural plate 84 near the ends 84a and 84b, respectively, thereof. The jukebox 10 housing 108 comprises a number of interconnected environmental housing walls such as side walls 110 and 112 best seen in FIG. 2, top wall 114 best seen in FIG. 3 and end walls 116 and 118 also best seen in FIG. 3.

Referring for a moment to FIG. 2, an opening in wall 112 indicated generally at 120 permits conditioned air (cooled or heated as appropriate) to enter into the housing of jukebox 10, as illustrated by arrows 124 and 126.

The base wall of the jukebox housing 108 comprises one or more structural members, the totality of which are labelled 130. Wall 130 may have a depressed area as best illustrated in FIG. 4 by means of broken away area 132. Structural member 130 has attached at one end thereof an L-shaped portion 134 to which is attached wall 116 of the jukebox housing 108. A structural plate 136 is secured to upper wall 114.

Guide shaft 98 is attached by means of support blocks 142 and 144 to plate element 136 and base structural member 130. Similarly, as illustrated in FIG. 4, support blocks 146 and 148 attach to plate 136 and structural base 130, respectively, to position guide shaft 96. It is to be understood that shafts 96 and 98 are parallel to one another and parallel to a vertical central axis 150 as illustrated in FIG. 4. Thus, structural plate 84 and with it container 40 are arranged to ride up and down shafts 96 and 98 in the directions indicated by double-ended arrow 152 (FIG. 3), respectively.

The vertical movement of container 40 is under control of a ball screw arrangement generally labelled 154 as illustrated in FIG. 4. Ball screw arrangement comprises a motor 156, a threaded screw shaft 158, and an internally threaded member 160 which is connected to structural plate 84. Threaded screw shaft 158 is journaled in journal bearings 161 connected to structural plate 136 and journal bearing 162 (shown partially broken away) connected to L-shaped member 134 (FIG. 3). Similarly, motor 156 is connected to L-shaped member 134. Motor 156 and screw shaft 158 are rotationally centered about a center line 164 which is parallel to center line 150. Accordingly, as motor 156 and thus shaft 158 are rotated about center line 164, structural member 84 and, more particularly, container 40, translate up and down along shafts 96 and 98 to thus move container 40 in the direction indicated by arrow 152 (FIG. 3).

The purpose of the vertical motion of container 40 is twofold. First, when it is desired to rotate container 40, as best illustrated in FIG. 4 by dashed line 166, it is necessary to center the container 40 midway vertically, as illustrated in FIG. 4, such that center line 82 (FIG. 3) is in line with housing 108 center line 170 (FIG. 4) and particularly coincident with the juncture of center line 170 and center line 150. Naturally, if the housing of jukebox 10 were made taller than illustrated in FIGS. 3 and 4, then rotation of container 40 could occur even without being vertically centered in the housing. But, the arrangement described permits the smallest possible vertical housing dimension, that is, a housing dimension which just clears container 40 as it rotates as illustrated by circular dashed line 172.

The second reason for the vertical movement of container 40 is to position a desired one of cartridges 12 for introduction into information utilization apparatus 14. In that connection, attention is directed to FIG. 3 wherein it is see that wall 118 in housing 108 includes an opening indicated by bracket 174 through which a cartridge 12 and therefore disk 50 may pass out of jukebox 10 and into information utilization apparatus 14. The opening includes walls 180 and 182 attached to wall 118 and a resilient member 184 connected at one end to walls 180–182 of jukebox 10 and at the other end to information utilization device 14. The purpose of this arrangement is to provide an environmentally enclosed area encompassing the utilization apparatus 14 and jukebox 10.

Also extending between jukebox 10 and apparatus 14 is a cartridge transport mechanism generally labelled 198 (FIG. 2). Cartridge transport mechanism 198 serves to transport a single cartridge 12, and therefore disk 50, between (in either direction jukebox 10 and utilization apparatus 14 as indicated by double-ended arrow 13. Although mechanism 198 is illustrated in FIGS. 2, 3, and 4, it is somewhat obscured by other components illustrated in those figures. Therefore, the transport mechanism is illustrated, to enlarged scale, in FIG. 6 which is a top view similar to a portion of FIG. 2 and in FIG. 7, which is a side view similar to a portion of FIG. 3.

In FIG. 6, a belt 200 has attached to its outer periphery 202, at uniformly spaced points around the periphery, cleats 204, four such cleats being illustrated in FIG. 6 and being typical. The purpose of the cleats is to engage one or more notches 60 in cartridge 12, FIG. 5, to move cartridge 12 as belt 200 moves in a manner to be hereinafter described.

Belt 200 is mounted on and extends between a drive pulley 206 and an idler pulley 208. Drive pulley 206 is secured to a shaft 210 (FIG. 7) which extends through and is rotationally mounted to an arm 212 near one end thereof. Idler pulley 208 is secured to a shaft 214 (FIG. 7), parallel to shaft 210, which is rotationally mounted to arm 212 near the other end thereof. Shaft 210 extends below arm 212 and rotatably through a second arm 216 and has mounted to its distal end a pulley 218, FIG. 7. Arm 216 is mechanically coupled to the jukebox housing 108 such as to wall 110 (FIG. 2) thereof to prevent movement thereof relative to jukebox 10.

A shaft 220 is rotationally mounted to arm 216 parallel to shaft 210. A first pulley 222 which is in alignment with pulley 218 (FIG. 7) and a second pulley 224 are secured to shaft 220. A motor 226 is positioned as illustrated in phantom in FIG. 2 such that pulley 228 attached to shaft 230 of the motor is generally aligned with shaft 220. That is, a plane (not shown) that passes through the central groove 228a of the pulley 228 and normal to shaft 230 also passes through or near the central axis 231 of shaft 220. Further, pulley 224 is positioned such that a plane (not shown) passing through the groove 224a of pulley 224 normal to axis 231 passes through or near shaft 230. A belt 232, illustrated as a dashed line for drawing clarity, extends between pulley 228 and pulley 224 in a half twist to provide drive from motor 226 to belt 200 via belt 233 which extends between pulleys 222 and 218.

When container 40 is pivoted, belt 200 and arm 212, if positioned as illustrated by solid lines in FIG. 6, would interfere with the stack of cartridges 12. To prevent this interference arm 212, shaft 214, pulley 208, and belt 200 are arranged to pivot as a unit about shaft 210. To accomplish the pivotal motion, a pivotal motor 234 (FIG. 7) mounted to arm 216 includes a shaft 236 rotatable in arm 216 about center line 244 to which is attached a plate or arm 238. The plate or arm contains a pivot pin 240 eccentrically located relative to center line 244. Pivot pin 240 extends through a slot 242 (in FIG. 6) in arm 212. Center line 244 is parallel to center line 232 of shaft 220. Therefore, when it is desired to rotate container 40, motor 234 operates to translate pin 240 and thus arm 212 to the position shown at 212' and to therefore move pulley 208 to the position shown at 208' out of the way of cartridges 12. A similar arrangement to arms 212 and 216 and parts coupled thereto is located on the other side of motor 226, as illustrated in FIG. 2. To operate the other assembly, motor 226 has a second pulley 246 coaxially located with pulley 228 and a second belt 248, shown as a dashed line, movably mounted thereto. Since it is mandatory that both transfer mechanisms 198 (FIG. 2) operate together, all of belts 200, 232, 233, 248 are timing belts or some equivalent thereof.

In one contemplated application, the jukebox is intended for use in a hostile environment where vibration is to be expected. Yet, as previously described, container 40 is intended to be rotated and translated. To prevent undesired movement of container 40, three locking mechanisms 260, 262 and 264 are provided as best illustrated in FIG. 2. Each locking mechanism, 262 being exemplary, comprises a solenoid such as 274 and a pin 276 movable by the solenoid into or out of its associated depressed area. Movement of the pin in the opposite direction (out of or into the depressed area is typically by means of a spring (not shown). Locking mechanisms 260 and 262 are secured to structural portions of the jukebox housing 108. Locking mechanism 264 is secured to structural member 84. Two additional locking mechanisms 266 and 268 are positioned as illustrated in phantom in FIG. 4 and also secured to structural portions of jukebox housing 108. As illustrated in FIG. 3, container 40 wall 40a contains a series of holes or depressions 270 each in line with a cartridge position in container 40. Similar openings (not shown) are on the opposite wall 40c of container 40 (FIG. 2). The positioning of locking mechanisms 260, 262, 266, and 268 are such that in any of the positions at which container 40 can be located, one pair 260-262 or 266-268 of locking mechanisms will engage a depression 270 in container 40.

As illustrated in FIG. 2, wall 40b of container 40 includes a depressed area 272 which is engaged by locking mechanism 264 when the container is positioned horizontally as illustrated in FIG. 4.

As best illustrated in FIG. 4, jukebox 10 includes a mounting base plate 280 to which jukebox housing 108 is coupled by means of isolation mounts 282, 284, 286 (FIG. 3), and an additional isolation mount not shown but which would be opposite isolation mount 286 in FIG. 3 and in line with isolation mount 284 in FIG. 4.

Operation of the jukebox is as follows. It will be assumed that it is desired to transport specific disk 290 (FIG. 3) from jukebox 10 into utilization unit 14 and that as the cartridge is initially oriented the desired information surface is down (as illustrated in FIG. 3), whereas it is desired to be up to be engaged by transducer 15 in utilization device 14. Therefore, container 40 must be rotated 180° about central axis 82. To accomplish the rotation, pivot motor 234 (FIG. 7) acts to rotate arm 212 and thus belt 200 away from the cartridges 12 to the position illustrated in phantom in FIG. 6. Prior to, subsequent to, or concurrently with that movement, motor 156 rotates screw drive 158 to position container 40 such that center line 82 of the container, illustrated as a dot in FIG. 4, is moved into alignment with center line 170 of the jukebox housing. Prior to that motion the pins in locking mechanisms 260, 262, 264, 266, and 268 are all retracted to permit up or down motion of container 40. Then motor 90 is operated to rotate container 40 and all cartridges and disks contained therein 180° so that the desired information surface of particular disk 290 is positioned up (toward the top of the page as illustrated in FIG. 3). Then motor 156 is again operated to drive screw 158 to lower container 40 such that cartridge 290 lines up with center line 170. Then all of the locking mechanisms 260 . . . 268 are operated to engage container 40 as indicated by arrow 91 (FIG.4) to maintain it in rigid alignment inside the jukebox housing 108. Then pivot motor 234 is operated to move arm 238 and with it pin 240 a half revolution about shaft 236 to position arm 212 and thus belt 200 as illustrated by the solid lines in FIG. 6. Finally, motor 226 (FIG. 6) is operated to move belt 200 in the direction shown by arrow 201 to thus pull by means of cleats 204 the desired cartridge 12 out of jukebox 10 and into utilization apparatus 14.

When it is thereafter desired to move cartridge 12 back into container 40, motor 226 is operated in the opposite rotational direction to cause belt 200 to move in the direction opposite of arrow 201. One or more cleats 204 engage detents 60 on cartridge 12 to move the cartridge back into container 40 and when moved all the way into container 40 to be engaged by spring 72 (FIG. 2a).

It will be understood that the goal is to orient disks 50 with regard to transducer 15 (FIG. 3). Cartridge 12 merely acts to contain and protect the disk. Thus, a discussion of cartridge movement is really a discussion of disk movement.

We claim:

1. Apparatus for presenting any one of N disks, each comprising two opposed information surfaces, to an information utilization apparatus with a given one of said information surfaces in information translating relationship therewith, comprising in combination:
   means for holding said N disks in a stack with one of said information surfaces of one disk facing one of said information surfaces of a next one of said disks;
   means for translating said N disk stack between first and second orientations, said first orientation allowing one of said information surfaces to become in information translating relation with said information utilization apparatus, said second orientation allowing the other of said information surfaces to become in information translating relation with said information utilization apparatus; and
   means for translating said stack to a position such as to enable a desired one of said N disks to be presented to said information utilization apparatus with said given one of said surfaces in said desired orientation.

2. The combination as set forth in claim 1 wherein said means for translating said N disk stack includes a means for rotating said disks as a stack.

3. The combination as set forth in claim 2 wherein said means for rotating said disks includes means for rotating said disks between two orientations which are 180° apart.

4. The combination as set forth in claim 2 and further including a housing defined by walls containing said apparatus for presenting any one of said N disks, and further including means for centering said stack of disks in said housing so that the axis of rotation of said means for rotating is substantially centered in said housing, whereby rotation can occur without the disks contacting any walls of said housing.

5. The combination as set forth in claim 2 wherein said utilization apparatus includes a disk accepting opening and wherein said means for translating said stack relative to said apparatus comprises means for moving said stack to a position such that said desired one of said N disks is in line with said opening.

6. The combination as set forth in claim 1 wherein said utilization apparatus includes a disk accepting opening and wherein said means for translating said stack relative to said utilization apparatus comprises means for moving said stack to a position such that said desired one of said N disks is in line with said opening.

7. The combination as set forth in claim 6 further including means for translating said desired one of N disks out of said stack and through said opening into said utilization apparatus.

8. The combination as set forth in claim 7 wherein means for translating said one of N disks out of said stack comprises a belt, said belt containing a plurality of cleats and said cleats being coupled to said disk for causing its movement through said opening.

9. The combination as set forth in claim 7 and further including means for translating said one of N disks out of said stack comprises a belt, said belt containing a plurality of cleats and said cleats being coupled to said disk for causing its movement through said opening.

10. The combination as set forth in claim 9 and further including means for moving said belt to a position remote from the location of said disks when said means for translating said disks rotates said disks as a stack and for thereafter repositioning said belt such that said cleats are in contact with said desired one of said N disks.

11. The combination as set forth in claim 6 further including means for translating said one of N disks out of said stack and through said opening into said utilization apparatus.

* * * * *